United States Patent [19]

Salloum et al.

[11] Patent Number: 4,497,945
[45] Date of Patent: Feb. 5, 1985

[54] TOUGH EPOXY POLYMERS FORMABLE BY REACTION INJECTION MOLDING

[75] Inventors: Robert J. Salloum, Troy; Richard P. Atkins, Rochester, both of Mich.

[73] Assignee: General Motors Corporation, Detroit, Mich.

[21] Appl. No.: 505,706

[22] Filed: Jun. 20, 1983

[51] Int. Cl.³ .................... C08G 59/42; C08G 59/62; C08J 5/00
[52] U.S. Cl. .................................... 528/94; 525/407; 528/110
[58] Field of Search .................. 528/94, 110; 525/407

[56] References Cited

U.S. PATENT DOCUMENTS 3,431,237  3/1969  Harry ................................. 528/110
3,849,383 11/1974  Fetscher et al. .................... 528/289
4,052,349 10/1977  Turley et al. ....................... 528/110

OTHER PUBLICATIONS

Noshay et al., "Epoxy/Modifier Block Copolymers", J. Polymer Science, Poly. Chem. Ed. 12, 689–705, (1974).

Primary Examiner—Earl A. Nielsen
Attorney, Agent, or Firm—George A. Grove

[57] ABSTRACT

A tough epoxy polymer is formed by pre-reacting a poly(oxypropylene) diol or triol with a chemical excess of an anhydride curing agent for epoxy resins. The resulting diester-diacid is then polymerized with an epichlorohydrin-bisphenol A epoxy resin. Suitable imidizole catalysts are preferred for the reactions.

5 Claims, No Drawings

TOUGH EPOXY POLYMERS FORMABLE BY REACTION INJECTION MOLDING

This invention relates to epoxy-anhydride-polyol copolymer systems that can be molded by reaction injection molding into particularly tough impact resistant articles. In another aspect, this invention relates to a mixing order-reaction sequence practice applicable to such systems that provides toughness and other desirable polymer properties.

There is a need, particularly in the automobile industry, for light weight tough materials that can be quickly formed into useful parts. One way of quickly forming polymer parts is by reaction injection molding (RIM). RIM processes based on urethane polymers have gained acceptance in the automotive industry. In a RIM process two liquid streams formulated and catalyzed to very quickly react with each other are rapidly mixed and introduced into a mold. The reactants and/or the mold may be preheated to a suitable temperature. In the mold the liquid constituents react usually within 60 seconds or so to form a solid polymeric molded article. The RIM practice is a low pressure operation permitting the use of relatively low cost molds. Complex shaped parts can be formed. The urethane RIM systems are not suitable for all applications. In some instances milled glass is added to increase rigidity. The addition of the glass fibers causes processing difficulties and increases wear of the equipment. It would be desirable to have alternate RIM systems based on other polymers.

Epoxy resins are monomers or prepolymers that further react with curing agents to yield thermosetting plastics. Both the epoxy resin and its curing agent may be liquid at their reaction temperature. Thus epoxy resins appear to be adaptable to the RIM process. However, epoxy polymers are normally very brittle. This limits their utility in automotive applications. As a practical matter, an epoxy RIM system for automotive use requires formulations that will cure in one minute or less and that have higher impact strength than present epoxy systems.

It is an object of our invention to provide an epoxy resin-anhydride curing agent system that can be rapidly polymerized in a mold into a tough part. It is a more specific object to provide such as epoxy based system incorporating a suitable polyether polyol in the epoxy polymer to provide toughness.

It is another object to provide a method using suitable epoxy resins, anhydride curing agents and propylene oxide type polyether polyols in a suitable reaction sequence to rapidly form a tough epoxy polymer article by polymerization in a mold.

In accordance with a preferred embodiment of our invention, these and other objects and advantages are accomplished as follows.

BRIEF SUMMARY

We have discovered a specific polyether polyol modified epoxy system that is very rapidly curable to an epoxy polymer providing both toughness and other desirable properties. In summary, the epoxy system is based on the following constituent families.

The epoxy resin constituent is a relatively low to medium molecular weight difunctional epichlorohydrin-bisphenol A resin. The curing agent constituent includes one or more members of a select family of organic anhydrides. Suitable anhydrides include phthalic anhydride and hydrogenated derivatives of phthalic anhydride such as tetrahydro- or hexahydrophthalic anhydride. Nadic methyl anhydride is also a suitable curing agent.

Our epoxy resin RIM system also incorporates a polyether polyol. Suitable polyether polyols are the family of liquid polyoxypropylene diols or triols having a molecular weight in the range of about 1,000 to 3,000. Diols are preferred. Suitably an amount of the polyol may be employed up to about 50 to 65 parts per one hundred parts of the epoxy resin employed.

The sequence of reacting these constituents is important in the practice of our method. Our tough epoxy polymer is prepared as follows. The anhydride and polyether polyol constituents are prereacted preferably using a suitable imidizole catalyst. Because of the relatively high molecular weight of the polyol, there will be a rather large chemical equivalent excess of the anhydride. At the completion of the prereaction, each polyol molecule will have been reacted with two or more anhydride molecules (depending on the functionality of the polyol) to form an acid-ester. In other words, each polyol will be capped with an anhydride moiety. We have found that this prereaction is very important in the practice of our invention, probably because it assures the methodical incorporation of the polyether polyol in the backbone of the epoxy polymer molecule that is ultimately formed.

When it is desired to mold an epoxy article, the prereacted anhydride-polyol and an epoxy resin are separately preheated to a desired reaction temperature. Both reactants are preferably liquid. They are rapidly mixed together and charged into a suitable mold. The mold may also have been preheated. The mixture is catalyzed with an imidizole catalyst which will be described further. The relatively low molecular weight epoxy resin and the prereacted anhydride-polyol quickly react to form an anhydride cured, polyol modified, epoxy polymer that is strong, tough and useful in automotive components. The combination of toughness and speed of reaction results from the selection of the specific epoxy resin, anhydride curing agent and polyol modifier as well as upon the prereaction of the polyol and the anhydride constituents.

Other objects and advantages of our invention will become more apparent from a detailed description thereof which follows.

DETAILED DESCRIPTION OF THE INVENTION

We prefer to use a general purpose low viscosity epoxy resin with the following structure:

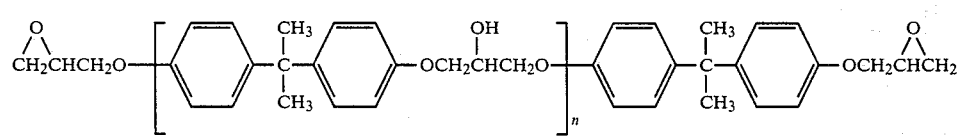

with n equal to 0.1 to 3. It is a prepolymer reaction product of epichlorohydrin and bisphenol A. Epon 828 supplied by Shell Chemical Company is an example of such a resin where n=0.1.

Anhydride curing agents for the epoxy resin are used in the practice of our invention. Examples of suitable anhydride curing agents are phthalic anhydride, tetrahydrophthalic anhydride, hexahydrophthalic anhydride (HHPA), methyl tetrahydrophthalic anhydride, and/or Nadic methyl anhydride. Other hydrogenated phthalic anhydrides or alkyl substituted, hydrogenated phthalic anhydrides may be used but the above listed are commercially available and very suitable for our purposes.

Suitable toughening modifiers for our epoxy polymer parts are poly(oxypropylene)polyols (diols or triols) having a molecular weight in the range of about 1,000 to 3,000. Such polyether diols are usually produced by initiating the polymerization of propylene oxide with propylene glycol or dipropylene glycol. Such polyether triols are initiated with 1,2,6-hexanetriol, trimethylolpropane, or glycerol. Examples of such commercially available polyether polyols are Pluracol 1010 and Pluracol 2010 supplied by BASF Wyandotte and Voranol P-2301 supplied by Dow Chemical. These polyether polyols have molecular weights of approximately 1,000, 2,000 and 2,300 respectively. They are diol in hydroxyl functionality. An example of a suitable poly(oxypropylene)triol is BASF Wyandotte's GP-3030 having a molecular weight of about 3,000. The molecular weights of the polyether polyols are calculated from a conventional hydroxyl number determination using potassium hydroxide.

The prereaction step between the anhydride constituent and the polyether polyol and the RIM polymerization step may be catlyzed using a suitable imidizole derivative. When carrying out the pre-reaction between a hydrogenated phthalic anhydride (for example) and a polyether polyol we prefer to use an imidizole that is alkyl substituted in the 1 position (i.e., it does not have a labile hydrogen in the 1 position). An example of such a catalyst is 1-methyl imidizole (1-MI). The use of 1-MI, or a like substituted imidizole, greatly increases the storage life of the resulting acid-ester. In contrast, for the reaction injection molding reaction, i.e., the final polymerization reaction, we prefer to use an imidizole derivative catalyst that is not substituted in the 1 position. A suitable catalyst for the RIM reaction is 2-ethyl-4-methyl imidizole (EMI). Such imidizoles, having a labile hydrogen in the 1 position, are most satisfactory for the RIM reaction.

By way of more specific illustrations, the following proportions of reactive constituents, in parts by weight, may be employed:

100 parts Epon 828 epoxy resin
44 phr Pluracol 2010 polyol
68 phr Hexahydrophthalic anhydride
1 phr 1-Methyl imidizole (polyol-anhydride reaction)
5 phr 2-Ethyl-4-methyl imidizole (RIM reaction)

In accordance with the practice of our method, the polyol and anhydride and 1-methyl imidizole are mixed together and heated at 150° C. for six hours. There is a large chemical excess of the anhydride and the polyol is essentially reacted completely with the anhydride, there being an ester-acid constituent capping each of the original secondary alcohol groups of the polyol. The following equation illustrates the reactions:

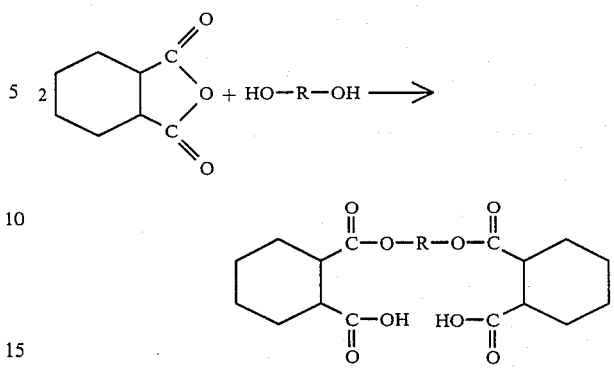

It is seen that a difunctional polyether molecule reacts with two anhydride molecules. The anhydride rings are opened and ester linkages formed with the polyether. There is an acid group at each end of the resulting acid-ester molecule for reaction with an epoxy resin. Such reaction incorporates the polyether within the resulting polymer.

We wished to study the rate of reaction of our prereacted polyol-anhydride with the epoxy resin under varying reactants and mold temperatures. Our practice was to separately heat the epoxy resin constituent and the polyol modified curing agent constituent (with EMI catalysts), rapidly mix the two together and add them to a heated mold. The mold defined a square slab having nominal dimensions of 200 mm×200 mm×4 mm. The respective molded articles were removed from the mold and tensile specimens were cut so that mechanical properties could be measured. The following table summarizes such data for reactant temperatures of 93° C. and 115° C. and mold temperatures of 93° C., 115° C. and 150° C. When the reactant and mold temperatures were both set at 93° C., the reaction did not occur at a significant rate. When the reactant temperature was set at 150° C., the reaction proceeded too quickly to pour the materials in the mold.

| Effect of Reaction and Mold Temperatures on Mechanical Properties* Temperature of Mold (°C.) | | | | | |
|---|---|---|---|---|---|
| | | | 93 | 115 | 150 |
| Reaction Temperature (°C.) | 93 | Tensile Strength (MPa) | No Cure | 32 | 28 |
| | | Young's Modulus(MPa) | | 1060 | 970 |
| | | Elongation (%) | | 39.1 | 27.2 |
| | | Toughness (MPa) | | 10.3 | 6.47 |
| | | Time to Peak Exotherm (sec) | | 306 | 150 |
| | | Peak Temperature (°C.) | | 117 | 146 |
| | 115 | Tensile Strength (MPa) | 39 | 40 | 35.5 |
| | | Young's Modulus(MPa) | 1470 | 1540 | 1270 |
| | | Elongation (%) | 22.6 | 17.8 | 20.9 |
| | | Toughness (MPa) | 7.6 | 6.27 | 6–12 |
| | | Time to Peak Exotherm (sec) | 660 | 180 | 54 |
| | | Peak Temperature (°C.) | 101 | 122 | 167 |

The above table provides a comparison of the effect of the reaction conditions on the physical properties of the several samples.

It summarizes physical properties commonly measured on molded samples as well as reaction data for mixtures of the above listed constituents prepared in the mixing sequence stated. With the exception of toughness, the above properties or reaction data are conventionally measured and the method of their measurement will not be repeated here.

Toughness is defined as the area under the stress-strain curve to fracture. It is, therefore, the specific energy required to break a sample in tension. Toughness is a material property and correlates with impact strength. We wanted to develop an epoxy system that provided toughness comparable to urethane RIM systems filled with 25 percent by weight flake glass. Such systems typically have toughness values of about 7 MPa.

For Epon 828 epoxy resin cured as a homopolymer with 6 phr of ethyl methyl imidizole, toughness values of 0.6 MPa or less were obtained. The Epon 828-HHPA system (no polyol) cured with 6 phr EMI exhibits toughness values in the 1.0 to 2.0 MPa range. Where Epon 828, HHPA and Pluracol 2010 polyol are simply reacted together, the toughness is not much improved. The polyol and anhydride were heated together as one component, the epoxy resin heated separately as the second component. The two components were hand mixed, catalyst added, hand mixed again, and poured into a preheated mold. When the reaction temperatures are optimized, this system has a maximum toughness of about 3.0 MPa. As seen in the above table, by prereacting the polyol with the anhydride curing agent in accordance with our invention, much higher toughness values are obtained, in the range of 6 to 12 MPa.

Thus, an important aspect of the practice of our invention is the prereaction of the polyol with the anhydride before the anhydride is used to cure the epoxy resin. We have found that when the polyol is fully reacted into the anhydride, much higher toughness values are obtained in the molded part. It is possible to get a polyol modified epoxy molded part by simply mixing together the polyol, the epoxy and the anhydride. However, if the prereaction step is not employed, toughness values of no more than about 3 MPa are obtained. If it is desired to obtain RIM epoxy parts having toughness values comparable to urethane RIM parts, our premixing step must be employed.

In general, we prefer to preheat our reactants to temperatures of about 100° to 120° C. and introduce them into a mold that has been preheated to temperatures of about 110° to 150° C. By processing our constituents at these temperatures reaction times of 1 to 2 minutes are obtainable.

We have investigated a wide range of polyols. A group of polyols having molecular weights in the range of about 400 to about 7,000 have been investigated. Polyols having diol and triol functionality and having primary or secondary alcohol end groups have been investigated. For the purposes of the practice of our invention, polyether polyols having a molecular weight in the range of about 1,000 to 3,000 should be used. They may have diol or triol functionality, but diol functionality is preferred. The use of polyols of this type prereacted with anhydride curing agents of the type specified and reacted with liquid difunctional epichlorohydrin bisphenol A epoxy resins will produce tough epoxy polymer molded parts. For maximum attainable toughness we prefer to use an amount of polyol in the range of about 30 to 65 parts per hundred of the epoxy resin. Lower amounts of polyol may be used if lower toughness is required.

In our work we used metal molds. For example, steel or aluminum molds are suitable.

While our invention has been described in terms of a few preferred specific embodiments thereof, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A method of forming a tough impact resistant epoxy article by reaction injection molding of an epichlorohydrin-bisphenol A epoxy resin, comprising prereacting a poly(oxypropylene) diol or triol having a molecular weight of about 1,000 to about 3,000 with a chemical excess of an anhydride curing agent for said epoxy to form a prepolymer in which the original hydroxyl groups of said diol or triol are each capped by reaction with a said anhydride molecule, and thereafter rapidly mixing said prepolymer with suitable amounts of a said epoxy resin and an imidizole catalyst and adding said mixture to a heated mold to polymerize said mixture and therein form said article.

2. A method of forming a tough impact resistant epoxy article by reaction injection molding of an epichlorohydrin-bisphenol A epoxy resin, comprising prereacting a poly(oxypropylene)diol or triol having a molecular weight of about 1,000 to about 3,000 with a chemical excess of an anhydride curing agent for said epoxy to form a prepolymer in which the original hydroxyl groups of said diol or triol are each capped by reaction with a said anhydride molecule, the amount of said diol or triol being up to about 65 parts by weight per hundred parts of said epoxy resin, and thereafter rapidly mixing said prepolymer with suitable amounts of a said epoxy resin and an imidizole catalyst and adding said mixture to a heated mold to polymerize said mixture and therein form said article.

3. A method of forming a tough impact resistant unfilled epoxy article by reaction injection molding of an epichlorohydrin-bisphenol A epoxy resin, comprising prereacting a poly(oxypropylene)diol or triol having a molecular weight of about 1,000 to about 3,000 with a chemical excess of an anhydride curing agent for said epoxy to form a prepolymer in which the original hydroxyl groups of said diol or triol are each capped by reaction with a said anhydride molecule, said anhydride being selected from the group consisting of phthalic anhydride, hexahydrophthalic anhydride, tetrahydrophthalic anhydride, methyl tetrahydrophthalic anhydride and Nadic methyl anhydride, the amount of said diol or triol being up to about 65 parts by weight per hundred parts of said epoxy resin, and thereafter rapidly mixing said prepolymer with suitable amounts of a said epoxy resin and an imidizole catalyst and adding said mixture to a heated mold to polymerize said mixture and therein form said article.

4. A tough impact resistant unfilled epoxy article which is the imidizole catalyzed polymerization reaction product of an epichlorohydrin-bisphenol A epoxy resin with the prepolymer reaction product of a poly(oxypropylene)diol or triol having a molecular weight of about 1,000 to about 3,000 with a chemical excess of an anhydride curing agent for said epoxy in which the original hydroxyl groups of said diol or triol are each capped by reaction with a said anhydride molecule, the amount of said diol or triol being up to about 65 parts by weight per hundred parts of said epoxy resin.

5. A tough impact resistant unfilled epoxy article which is the imidizole catalyzed polymerization of an epichlorohydrin-bisphenol A epoxy resin with the prepolymer reaction product of a poly(oxypropylene)diol or triol having a molecular weight of about 1,000 to about 3,000 with a chemical excess of an anhydride curing agent for said epoxy in which the original hydroxyl groups of said diol or triol are each capped by reaction with a said anhydride molecule, the amount of said diol or triol being up to about 65 parts by weight per hundred parts of said epoxy resin, said anhydride being selected from the group consisting of phthalic anhydride, hexahydrophthalic anhydride, tetrahydrophthalic anhydride, methyl tetrahydrophthalic anhydride and Nadic methyl anhydride, the amount of said diol or triol being up to about 65 parts by weight per hundred parts of said epoxy resin, and thereafter rapidly mixing said prepolymer with suitable amounts of a said epoxy resin and an imidizole catalyst and adding said mixture to a heated mold to polymerize said mixture and therein form said article.

* * * * *